United States Patent
Sarjovaara et al.

(10) Patent No.: US 12,331,254 B2
(45) Date of Patent: Jun. 17, 2025

(54) METHOD FOR PRODUCING RENEWABLE FUELS

(71) Applicant: Neste Oyj, Espoo (FI)

(72) Inventors: Teemu Sarjovaara, Espoo (FI); Riikka-Mari Haara, Espoo (FI); Merja Kouva, Espoo (FI); Ulla Kiiski, Espoo (FI); Jesse Vilja, Espoo (FI)

(73) Assignee: NESTE OYJ, Espoo (FI)

( * ) Notice: Subject to any disclaimer, the term of this patent is extended or adjusted under 35 U.S.C. 154(b) by 341 days.

(21) Appl. No.: 17/776,911

(22) PCT Filed: Nov. 13, 2020

(86) PCT No.: PCT/FI2020/050758
§ 371 (c)(1),
(2) Date: May 13, 2022

(87) PCT Pub. No.: WO2021/094658
PCT Pub. Date: May 20, 2021

(65) Prior Publication Data
US 2022/0411702 A1     Dec. 29, 2022

(30) Foreign Application Priority Data
Nov. 15, 2019  (WO) ................ PCT/FI2019/050817

(51) Int. Cl.
*C10G 45/58*     (2006.01)
*C10G 3/00*      (2006.01)
(Continued)

(52) U.S. Cl.
CPC .............. *C10G 45/58* (2013.01); *C10G 3/46* (2013.01); *C10G 3/50* (2013.01); *C10G 3/60* (2013.01);
(Continued)

(58) Field of Classification Search
CPC . C10G 45/58; C10G 3/46; C10G 3/50; C10G 3/60; C10G 67/02;
(Continued)

(56) References Cited

U.S. PATENT DOCUMENTS

| 8,039,682 B2 | 10/2011 | Mccall et al. |
| 8,058,492 B2 | 11/2011 | Anumakonda et al. |

(Continued)

FOREIGN PATENT DOCUMENTS

| BR | PI0908586 A2 | 9/2015 |
| BR | 112019014621 A2 | 4/2020 |

(Continued)

OTHER PUBLICATIONS

International Search Report (PCT/ISA/210) and Written Opinion (PCT/ISA/237) mailed on Feb. 11, 2021, by the Finnish Patent and Registration Office as the International Searching Authority for International Application No. PCT/FI2020/050754. (20 pages).
(Continued)

*Primary Examiner* — Ali Z Fadhel
(74) *Attorney, Agent, or Firm* — Buchanan Ingersoll & Rooney, PC (57) ABSTRACT

The present disclosure provides a marine fuel component produced from feedstock of biological origin and a method for producing the same. The present disclosure provides marine fuel blends containing the marine fuel component of biological origin and at least one additional marine fuel.

8 Claims, 2 Drawing Sheets

(51) Int. Cl.
*C10G 7/00* (2006.01)
*C10G 67/02* (2006.01)
*C10L 1/08* (2006.01)
*C10M 109/02* (2006.01)

(52) U.S. Cl.
CPC .............. *C10G 7/00* (2013.01); *C10G 67/02* (2013.01); *C10L 1/08* (2013.01); *C10M 109/02* (2013.01); *C10G 2300/1011* (2013.01); *C10G 2300/1014* (2013.01); *C10G 2300/1018* (2013.01); *C10G 2300/202* (2013.01); *C10G 2300/205* (2013.01); *C10G 2300/207* (2013.01); *C10G 2300/208* (2013.01); *C10G 2300/302* (2013.01); *C10G 2300/304* (2013.01); *C10G 2300/307* (2013.01); *C10G 2300/308* (2013.01); *C10G 2300/4006* (2013.01); *C10G 2300/4012* (2013.01); *C10G 2300/4081* (2013.01); *C10G 2300/80* (2013.01); *C10G 2400/04* (2013.01); *C10G 2400/08* (2013.01); *C10G 2400/10* (2013.01); *C10L 2200/0469* (2013.01); *C10L 2270/026* (2013.01); *C10L 2270/04* (2013.01); *C10M 2203/003* (2013.01)

(58) Field of Classification Search
CPC .... C10G 2300/1011; C10G 2300/1014; C10G 2300/1018; C10G 2300/202; C10G 2300/205; C10G 2300/207; C10G 2300/208; C10G 2300/302; C10G 2300/304; C10G 2300/307; C10G 2300/308; C10G 2300/4006; C10G 2300/4012; C10G 2300/4081; C10G 2300/80; C10G 2400/04; C10G 2400/08; C10G 2400/10; C10G 65/043; C10G 3/00; C10L 1/08; C10L 2200/0469; C10L 2270/026; C10L 2270/04; C10M 109/02; C10M 2203/003; H01B 3/22; Y02E 50/10; Y02P 30/00; Y02P 30/20; Y02T 50/678

See application file for complete search history.

(56) References Cited

U.S. PATENT DOCUMENTS

| | | | |
|---|---|---|---|
| 8,927,795 | B2 | 1/2015 | Mccall et al. |
| 9,321,970 | B2 | 4/2016 | Dupassieux et al. |
| 9,458,396 | B2* | 10/2016 | Weiss ...................... C10G 3/47 |
| 9,469,583 | B2 | 10/2016 | Hakola et al. |
| 9,914,880 | B2 | 3/2018 | Fichtl et al. |
| 10,131,848 | B2 | 11/2018 | Aalto et al. |
| 10,246,658 | B2 | 4/2019 | Abhari et al. |
| 10,351,781 | B2 | 7/2019 | Sinha et al. |
| 10,640,721 | B2 | 5/2020 | Sandberg et al. |
| 10,954,459 | B2 | 3/2021 | Kuronen et al. |
| 11,001,774 | B2 | 5/2021 | Abhari et al. |
| 11,236,280 | B2 | 2/2022 | Abhari et al. |
| 11,306,265 | B2 | 4/2022 | Kuronen et al. |
| 11,459,510 | B2 | 10/2022 | Iversen et al. |
| 2009/0250376 | A1 | 10/2009 | Brandvold et al. |
| 2009/0283442 | A1 | 11/2009 | Mccall et al. |
| 2009/0287029 | A1 | 11/2009 | Anumakonda et al. |
| 2009/0294324 | A1 | 12/2009 | Brandvold et al. |
| 2009/0301930 | A1 | 12/2009 | Brandvold et al. |
| 2011/0232169 | A1 | 9/2011 | Cherrillo et al. |
| 2013/0116490 | A1 | 5/2013 | Dupassieux et al. |
| 2013/0305591 | A1 | 11/2013 | Mccall et al. |
| 2014/0291200 | A1 | 10/2014 | Weiss et al. |
| 2015/0011784 | A1 | 1/2015 | Aoki et al. |
| 2015/0018581 | A1 | 1/2015 | Kettunen et al. |
| 2015/0094506 | A1 | 4/2015 | Fichtl et al. |
| 2015/0191404 | A1 | 7/2015 | Aalto et al. |
| 2016/0289568 | A1 | 10/2016 | Dutta et al. |
| 2017/0009144 | A1 | 1/2017 | Aalto et al. |
| 2017/0158966 | A1 | 6/2017 | Fichtl et al. |
| 2017/0165655 | A1 | 6/2017 | Sinha et al. |
| 2017/0183593 | A1 | 6/2017 | Sandberg et al. |
| 2017/0327757 | A1 | 11/2017 | Abhari et al. |
| 2018/0148656 | A1 | 5/2018 | Laurent et al. |
| 2018/0216021 | A1 | 8/2018 | Kuronen et al. |
| 2019/0276758 | A1 | 9/2019 | Abhari et al. |
| 2019/0382666 | A1 | 12/2019 | Wiklund |
| 2020/0048522 | A1 | 2/2020 | Doucet et al. |
| 2020/0270544 | A1 | 8/2020 | Plancq |
| 2021/0163835 | A1 | 6/2021 | Kuronen et al. |
| 2021/0261875 | A1 | 8/2021 | Abhari et al. |
| 2022/0033717 | A1 | 2/2022 | Kiiski et al. |
| 2022/0081626 | A1 | 3/2022 | Myllyoja et al. |
| 2022/0177791 | A1 | 6/2022 | Kuronen et al. |
| 2022/0184581 | A1* | 6/2022 | Singh ........................ C10G 3/44 |
| 2022/0396739 | A1 | 12/2022 | Nortio et al. |
| 2022/0403252 | A1 | 12/2022 | Vilja et al. |
| 2022/0411699 | A1 | 12/2022 | Rantasalo et al. |
| 2023/0137687 | A1 | 5/2023 | Jadaun et al. |

FOREIGN PATENT DOCUMENTS

| | | | |
|---|---|---|---|
| CN | 102027096 | A | 4/2011 |
| CN | 102027097 | A | 4/2011 |
| CN | 102124080 | A | 7/2011 |
| CN | 103122253 | A | 5/2013 |
| EP | 1741768 | A1 | 1/2007 |
| EP | 1956070 | A1 | 8/2008 |
| EP | 2141217 | A1 | 1/2010 |
| EP | 1963461 | B1 | 5/2018 |
| EP | 3352177 | A1 | 7/2018 |
| FI | 960525 | A | 8/1997 |
| GB | 692427 | A | 6/1953 |
| JP | 2011526640 | A | 10/2011 |
| WO | 2009151690 | A2 | 12/2009 |
| WO | 2009151692 | A2 | 12/2009 |
| WO | 2013115137 | A1 | 8/2013 |
| WO | 2014128227 | A1 | 8/2014 |
| WO | 2015101837 | A2 | 7/2015 |
| WO | 2015142887 | A1 | 9/2015 |
| WO | 2018078021 | A1 | 5/2018 |
| WO | 2018138412 | A1 | 8/2018 |
| WO | 2018139971 | A1 | 8/2018 |
| WO | 2018234189 | A1 | 12/2018 |
| WO | 2019002679 | A1 | 1/2019 |
| WO | 2019092379 | A2 | 5/2019 |
| WO | 2020109653 | A1 | 6/2020 |
| WO | 2021013860 | A1 | 1/2021 |
| WO | 2021094655 | A1 | 5/2021 |
| WO | 2021094657 | A1 | 5/2021 |
| WO | 2021094658 | A1 | 5/2021 |

OTHER PUBLICATIONS

International Search Report (PCT/ISA/210) and Written Opinion (PCT/ISA/237) mailed on Feb. 17, 2021, by the European Patent Office as the International Searching Authority for International Application No. PCT/FI2020/050756. (11 pages).

International Search Report (PCT/ISA/210) and Written Opinion (PCT/ISA/237) mailed on Feb. 18, 2021, by the Finnish Patent and Registration Office as the International Searching Authority for International Application No. PCT/FI2020/050757. (15 pages).

International Search Report (PCT/ISA/210) and Written Opinion (PCT/ISA/237) mailed on Feb. 15, 2021, by the Finnish Patent and Registration Office as the International Searching Authority for International Application No. PCT/FI2020/050758. (19 pages).

International Search Report (PCT/ISA/210) mailed on Feb. 19, 2020, by the European Patent Office as the International Searching Authority for International Application No. PCT/FI2019/050817. (12 pages).

Written Opinion of the International Preliminary Examining Authority (PCT/IPEA/408) issued in corresponding International Patent (56) References Cited

OTHER PUBLICATIONS

Application No. PCT/FI2020/050754 dated Jan. 13, 2022. (15 pages).
Written Opinion of the International Preliminary Examining Authority (PCT/IPEA/408) issued in corresponding International Patent Application No. PCT/FI2020/050757 dated Dec. 16, 2021. (11 pages).
Written Opinion of the International Preliminary Examining Authority (PCT/IPEA/408) issued in corresponding International Patent Application No. PCT/FI2020/050758 dated Jan. 12, 2022. (15 pages).
International Preliminary Report on Patentability (PCT/IPEA/409) issued in corresponding International Patent Application No. PCT/FI2020/050754 dated Mar. 4, 2022. (37 pages).
International Preliminary Report on Patentability (PCT/IPEA/409) issued in corresponding International Patent Application No. PCT/FI2020/050757 dated Mar. 7, 2022. (29 pages).
International Preliminary Report on Patentability (PCT/IPEA/409) issued in corresponding International Patent Application No. PCT/FI2020/050758 dated Mar. 4, 2022. (41 pages).
Finnish Search Report issued in corresponding Patent Application No. 20185965 dated Mar. 7, 2019. (2 pages).
Chevron, "Diesel Fuels Technical Review", 2007, pp. 1-107, Chevron Corporation. (116 pages).
Dijs, I. J., et al., "Quantitative determination by 14C analysis of the biological component in fuels", Radiocarbon, 2006, vol. 48, Nr. 3, pp. 315-323. (9 pages).
DNV GL, Using biodiesel in marine diesel engines: new fuels, new Challenges, Online Oct. 14, 2020 (retrieved on Jan. 29, 2021, online at www.dnvgl.com/news/using-biodiesel-in-marine-dieselengines-new-fuels-new-challenges-186705. (2 pages).
Neste Retail, Technical Data Sheet, Jun. 14, 2021, https://www.neste.fi/static/datasheet_pdf/150240_fi.pdg. (2 pages).
Ovaska, T. et al., Effects of alternative marine diesel fuels on the exhaust particle size distributions of an off-road diesel engine:, Applied Thermal Engineering, Jan. 28, 2019, vol. 150, pp. 1168-1176. (9 pages).
Repsol, Electra 3x Plus Industr, Lubricants-Technical data sheet; Aug. 1, 2016, XP055666025, retrieved from the Internet URL: https:// www.repsol.com/imagenes/global/en/RP_ELECTRA_3X_PLUS_EN_tcml4-54907.pdf [retrieved on Feb. 6, 2020]. (2 pages).
Starck, L., et al., "Production of Hydroprocessed Esters and Fatty Acids (HEFA)—Optimisation of Process Yield", Oil & Gas Science and Technology Rev. IFP Energies nouvelles, Jun. 23, 2014, vol. 71, No. 1. (13 pages).
Office Action issued on Apr. 3, 2023, by the Brazilian Patent Office in corresponding Brazilian Application No. BR112022008202-9, and an English Translation of the Office Action. (14 pages).
Mohd Noor et al., "Biodiesel as Alternative Fuel for Marine Diesel Engine Applications: A Review", Renewable and Sustainable Energy Reviews, Jun. 9, 2018, pp. 127-142, vol. 94, XP085453841.
The extended European Search Report issued on Dec. 15, 2023, by the European Patent Office in corresponding European Application No. 20886606.1. (9 pages).
The extended European Search Report issued on Dec. 15, 2023, by the European Patent Office in corresponding European Application No. 20886773.9. (10 pages).
Notification of the First Office Action issued on Mar. 11, 2023, by the Chinese Patent Office in corresponding Chinese Patent Application No. 202080078127.9, and an English Translation of the Office Action. (17 pages).
Office Action (Notice of Reasons for Refusal) issued on Jun. 13, 2023, by the Japanese Patent Office in corresponding Japanese Patent Application No. 2022-527229, and an English Translation of the Office Action. (11 pages).
Office Action issued on Mar. 14, 2024, by the U.S. Patent and Trademark Office in U.S. Appl. No. 17/776,931.
Office Action issued on Oct. 10, 2024, by the U.S. Patent and Trademark Office in co-pending U.S. Appl. No. 17/776,902. (12 pages).
Office Action issued on Sep. 12, 2024, by the U.S. Patent and Trademark Office in co-pending U.S. Appl. No. 17/776,831. (32 pages).
Office Action issued on Mar. 13, 2025, by the U.S. Patent and Trademark Office in co-pending U.S. Appl. No. 17/776,902. (13 pages).
Office Action issued on Jan. 6, 2025, by the U.S. Patent and Trademark Office in co-pending U.S. Appl. No. 17/776,831. (8 pages).

* cited by examiner

METHOD FOR PRODUCING RENEWABLE FUELS

FIELD OF THE INVENTION

The present invention relates to a method for combined production of essentially two paraffinic products suitable for use as fuels, and more particularly to the paraffinic products obtainable by the method. Especially, one of the products is aviation fuel of biological origin and the further paraffinic product is marine fuel of biological origin.

BACKGROUND

The following background description art may include insights, discoveries, understandings or disclosures, or associations together with disclosures not known to the relevant art prior to the present invention but provided by the present disclosure. Some such contributions disclosed herein may be specifically pointed out below, whereas other such contributions encompassed by the present disclosure the invention will be apparent from their context.

Aviation fuels or jet fuels are traditionally manufactured from crude mineral oil, which is typically separated by means of distillation into straight run kerosene fraction boiling in the aviation fuel range, and if required, followed by optional conversion processes like cracking etc. well known in the art. Mineral oil derived kerosene meeting aviation fuel requirements may also be produced for example by hydroprocessing or by caustic washing of straight run kerosene. Currently aviation fuels are produced also from renewable feedstock i.e. feedstock of biological origin.

US2017327757 relates to renewable compositions suitable as a diesel fuel, a diesel fuel additive, an aviation fuel and an aviation fuel additive and to a method for producing the same. The method comprises hydrotreating bio-renewable feedstock in a fixed bed hydrotreatment reactor and fractionating the hydrotreated product. The renewable fuels may be blended with petroleum based fuel and/or synthetic fuel.

EP2141217 (A1) relates to hydrocarbons of biological origin suitable as aviation fuels or jet fuels and as blending stocks for aviation fuels and to a process for producing the same. The process comprises hydrodeoxygenation of renewable feedstock followed by isomerization, separating fractions and recycling the fraction boiling at a temperature above 200° C. to re-isomerization.

There is a growing end user demand for sustainable, bio-originating and possibly recycled alternatives in the field of fuels, especially aviation fuels, and also marine fuels. Although not yet mandated to contain bio-originating products, there are clear signs of legislative directives emerging also for these areas. Currently, there is limited offering of bio-originating alternatives available for the above-mentioned applications. Further, the bio-originating alternatives are typically not cost competitive with the conventional offering, which has limited the development of the bio-originating and recycled aviation fuels and marine fuels. There is a need to develop even more feasible and effective processes in these areas.

Aviation fuel market has been forecasted to grow during 2018-2022 at a CAGR (Compound Annual Growth Rate) of 3.81%. IATA (International air transport association) recognizes the need to address the global challenge of climate change and adopted a set of ambitious targets to mitigate $CO_2$ emissions from air transport. One way to achieve this is by improved technology, including the deployment of sustainable low-carbon fuels.

The deployment of more sustainable aviation fuels means that more feedstock material must be made available globally to supply both the aviation industry and transportation sector. The synthetic or renewable fuel production technologies have traditionally been designed for producing fuels for the road transportation sector where the fuels' cold temperature properties are not as critical as in aviation.

Environmental interests drive fuel producers to use renewable sources in the manufacture of marine fuels. The current trend is toward marine fuels having lower impact on the environment, and they should preferably have a small impact on greenhouse gases such as carbon dioxide. Low sulfur content would also be advantageous because it is an aim to reduce sulfur emissions particularly in arctic areas.

US2014291200 (A1) discloses a process for production of marine fuel comprising a sulfur content that is less than 100 ppm from renewable feedstock comprising vegetable oils and animal fats containing triglycerides and fatty acids or esters with hydrocarbon fatty chains having a number of carbon atoms of between 8 and 25. The feedstock contains contents of sulfur and nitrogen that are less than 500 ppm and contents of aromatic compounds that are less than 5% by weight.

WO2020109653 (A1) discloses a marine fuel blend and a method for producing the same. The blend comprises a marine fuel having a density between 860 and 960 kg/m3 at 15° C. and 0.5-50 vol-% of renewable hydrotreated fuel. The marine fuel blend has a pour point which is lower than the calculated pour point expressed as the weighted average of the pour points of the marine fuel and the renewable hydrotreated fuel.

Marine fuels of biological origin are already presently offered in the market, but there is a continuous demand for more efficient processing and enhanced product quality. Novel marine fuels are needed to meet requirements set by regulations and also consumer needs.

There is thus a growing end user demand for sustainable, bio-originating recycled alternatives in both fields, aviation fuels and marine fuels. Although not yet mandated to contain bio-originating products, there are clear signs of legislative directives emerging also for marine areas. Currently, there is limited offering of bio-originating alternatives available for the above-mentioned applications. Further, the bio-originating alternatives are typically not cost competitive with the conventional offering, which has limited the development of the bio-originating and recycled aviation fuels and marine fuels. There is a need to develop feasible and effective processes in these areas.

There is a clear need for a process to produce lighter fuels meeting jet fuel or aviation fuel requirements. Yet, at the same time, production flexibility in view of producing desired fuel grade to serve two or more transportation sectors needs to be maintained.

Furthermore, improving the feedstock usage efficiency resulting in lower production losses contributes both to sustainability and profitability of the fuel production process in the long run.

SUMMARY

The following presents a simplified summary of the features disclosed herein to provide a basic understanding of some exemplary aspects of the invention. This summary is not an extensive overview of the invention. It is not intended to identify key/critical elements of the invention or to delineate the scope of the invention. Its sole purpose is to present some concepts disclosed herein in a simplified form as a prelude to a more detailed description.

In the first aspect the present invention provides a method for combined production of an aviation fuel and a marine fuel both of biological origin, the method comprising providing feedstock of biological origin containing fatty acids and/or esters of fatty acids, and subjecting the feedstock to hydrotreatment and isomerization to obtain a paraffinic hydrocarbon intermediate, and fractionating said paraffinic hydrocarbon intermediate into at least two fractions; a lighter fraction fulfilling the specification ASTM D7566-20 Annex A2 for aviation fuel, and a heavier fraction fulfilling the specifications of ISO 8217(2017) for marine fuel, wherein the production capacity of the lighter fraction and the production capacity of the heavier fraction are adjusted by a selection of process conditions, preferably the hydroisomerization process conditions, wherein yield of the lighter fraction is 60-90 wt-% of the total weight of the two fractions, and yield of the heavier fraction is 10-40 wt-% of the total weight of the two fractions, and wherein a combined yield of the two fractions is at least 98 wt-% of the paraffinic hydrocarbon intermediate of biological origin.

In the second aspect, a marine fuel component of biological origin is provided comprising 0-5 wt-% of n-paraffins in C16-C20 range and 90-97 wt-% isoparaffins in C16-C20 range, from 21 wt-% to 45 wt-% of C17 paraffins and from 50 wt-% to 75 wt-% of C18 paraffins.

In the third aspect, use of the marine fuel component of biological origin according to the invention as marine fuel or for a marine fuel blend fulfilling the requirements of ISO 8217 is provided.

In the fourth aspect, various marine fuel blends are provided comprising the marine fuel component according to the present invention together with fossil marine fuel, HVO fuel and FAME as depicted by the claims.

One or more examples of implementations are set forth in more detail in the accompanying drawing and the description below. Other features will be apparent from the description and drawing, and from the claims.

The present invention provides a process for producing both lighter and heavier fuels meeting the aviation fuel and the marine fuel requirements. Moreover, production flexibility in view of producing desired fuel grades to serve two or more transportation sectors is maintained by suitably fractionating the processed feedstock into the lighter fraction meeting the aviation fuel requirements and into the heavier fraction meeting the marine fuel requirements. Consequently, the fractionation is a critical step because if done unsuccessfully, it can cause that the products obtained do not fulfil either the aviation fuel or the marine fuel requirements.

On the other hand, considerable benefits and production flexibility are obtained as through the well-executed fractionation the end products serve two or more transportation sectors. In the present invention, the feedstock usage efficiency is excellent and the production losses are low, meaning that the profitability of the fuel production process is high in the long run.

As there typically is less flexibility on the properties that the aviation fuel component must meet, it drives the fractionation process and leaves the heavier marine fraction as the bottom product. In the method of the present invention it is beneficial that the renewable marine fraction meets the marine fuel specification as such, and exhibits even improved properties over other marine fuel types when blended.

BRIEF DESCRIPTION OF THE DRAWINGS

In the following the invention will be described in greater detail by means of preferred embodiments with reference to the attached FIG. 1 and FIG. 2.

DETAILED DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising", "containing" and "including" should be understood as not limiting the described embodiments to consist of only those features that have been mentioned and such embodiments may also contain features/structures that have not been specifically mentioned.

The present invention relates to combined production of two paraffinic hydrocarbon products, an aviation fuel component and a marine fuel component by hydrotreatment and isomerization of feedstock of biological origin followed by fractionation. The aviation fuel component is preferably a synthesized paraffinic kerosine from hydrogenated esters and fatty acids (HEFA-SPK) fulfilling the ASTM D7566-20 Annex A2 standard for aviation turbine fuel containing synthesized hydrocarbons. The marine fuel component is preferably a component complying with the ISO 8217(2017) marine fuel standard.

By term "hydrotreatment" is meant herein a catalytic process of organic material by all means of molecular hydrogen. Preferably, hydrotreatment removes oxygen from organic oxygen compounds as water i.e. by hydrodeoxygenation (HDO).

Additionally or alternatively hydrotreatment may remove sulphur from organic sulphur compounds as hydrogen sulphide ($H_2S$), i.e. by hydrodesulphurisation, (HDS), it may further remove nitrogen from organic nitrogen compounds as ammonia ($NH_3$), i.e. by hydrodenitrofication (HDN), and/or it may remove halogens, for example chlorine, from organic chloride compounds as hydrochloric acid (HCl), i.e. by hydrodechlorination (HDCl). It may further remove aromatic compounds by hydrodearomatization (HDA).

By the term "hydrodeoxygenation" (HDO) is meant herein hydrodeoxygenation of feedstock of biological origin, such as feedstock comprising triglycerides or other fatty acid derivatives or fatty acids, is meant the removal of carboxyl oxygen as water by means of molecular hydrogen under the influence of a catalyst. The hydrodeoxygenation may be accompanied by hydrodesulphurisation, hydrodenitrification, and/or hydrodechlorination reactions.

Removing oxygen from the feedstock of biological origin may also be done by decarboxylation where oxygen is removed in the form of $CO_2$, and by decarbonylation where oxygen is removed in the form of CO.

By the term "isomerization" is meant reaction(s) that causes branching of hydrocarbon chains of hydrotreated feedstock. Branching of hydrocarbon chains improves e.g. cold properties, the isomerized hydrocarbons have better cold properties compared to merely hydrotreated feedstock. Better cold properties refer to e.g. a lower temperature value of a pour point. The formed isoparaffins (also referred to as i-paraffins) may have one or more side chains, or branches, typically methyl or ethyl groups.

Typically, HDO and isomerization, such as hydroisomerization, reactions take place in the presence of a catalyst suitable for the reaction. Reaction conditions and catalysts typically used in the hydrodeoxygenation of biological material and in the isomerisation of resultant n-paraffins are disclosed in several documents. Examples of such processes are presented in e.g. FI100248, Examples 1-3, and in WO 2015/101837 A2.

Feedstock of Biological Origin

Feedstock of biological origin i.e. renewable feedstock refers to a feedstock derived from a biological raw material. The sources for renewable feedstock are numerous including oils and/or fats, usually containing lipids (e.g. fatty acids or glycerides), such as plant oil/fats, vegetable oil/fats, animal oil/fats, algae oil/fats, fish oil/fats and algae oil/fats, or oil/fats from other microbial processes, for example, genetically manipulated algae oil/fats, genetically manipulated oil/fats from other microbial processes and also genetically manipulated vegetable oil/fats. Components of these materials may also be used, for example, alkyl esters, typically C1-C5 alkyl esters, such as methyl, ethyl, propyl, iso-propyl, butyl, sec-butyl esters, or olefins. Additionally, the renewable feedstock may include C1-C5 alkyl alcohols, particularly methyl, ethyl, propyl, iso-propyl, butyl, and/or sec-butyl esters of fatty acids, and any combinations thereof.

The renewable feedstock may additionally include free fatty acids, fatty acid esters (including mono-, di-, and triglycerides), or combinations thereof. For example, the free fatty acids may include free fatty acids obtained by stripping free fatty acids from a triglyceride transesterification feedstock. The renewable feedstock may include the fatty acid distillate from vegetable oil deodorization. Depending on level of pretreatment, fats, oils, and greases may contain impurities, such as between about 1 wppm and about 1,000 wppm phosphorus, and between about 1 wppm and about 500 wppm total metals, mainly sodium, potassium, magnesium, calcium, iron, and copper. Plant and/or vegetable oils and/or microbial oils may include babassu oil, *carinata* oil, soybean oil, canola oil, coconut oil, rapeseed oil, crude tall oil (CTO), tall oil (TO), tall oil fatty acid (TOFA), tall oil pitch (TOP), palm oil (PO), palm oil fatty acid distillate (PFAD), jatropha oil, palm kernel oil, sunflower oil, castor oil, camelina oil, archaeal oil, bacterial oil, fungal oil, protozoal oil, algal oil, seaweed oil, oils from halophiles, and mixtures of any two or more thereof. These oils may have been classified as crude, degummed, and RBD (refined, bleached, and deodorized) grade, depending on the level of pretreatment and residual phosphorus and metals content. Animal fats and/or oils may include inedible tallow, edible tallow, technical tallow, floatation tallow, lard, poultry fat, poultry oils, fish fat, fish oils, and mixtures of any two or more thereof. Greases may include yellow grease, brown grease, waste vegetable oils, restaurant greases, trap grease from municipalities such as water treatment facilities, and spent oils from industrial packaged food operations, and mixtures of any two or more thereof.

These oils and/or fats typically comprise C10-C24 fatty acids and derivatives thereof, including esters of fatty acids, glycerides, i.e. glycerol esters of fatty acids. The glycerides may specifically include monoglycerides, diglycerides and triglycerides.

In one embodiment, the feedstock includes waste and residue material originating from animal fat/oil, plant fat/oil such as palm oil and derivatives thereof, and used cooking oil (UCO).

The $^{14}$C-isotope content can be used as evidence of the renewable or biological origin of a feedstock or product. Carbon atoms of renewable material comprise a higher number of unstable radiocarbon ($^{14}$C) atoms compared to carbon atoms of fossil origin. Therefore, it is possible to distinguish between carbon compounds derived from biological sources, and carbon compounds derived from fossil sources by analysing the ratio of $^{12}$C and $^{14}$C isotopes. Thus, a particular ratio of said isotopes can be used to identify renewable carbon compounds and differentiate those from non-renewable i.e. fossil carbon compounds. The isotope ratio does not change in the course of chemical reactions. Example of a suitable method for analysing the content of carbon from biological sources is ASTM D6866 (2020). An example of how to apply ASTM D6866 to determine the renewable content in fuels is provided in the article of Dijs et al., Radiocarbon, 48(3), 2006, pp 315-323. For the purpose of the present invention, a carbon-containing material, such as a feedstock or product, such as marine fuel, is considered to be of renewable origin if it contains 90% or more modern carbon (pMC), such as 100% modern carbon, as measured using ASTM D6866.

The oils and/or fats of biological origin may include a single kind of oil, a single kind of fat, mixtures of different oils, mixtures of different fats, mixtures of oil(s) and fat(s), fatty acids, glycerol, and/or mixtures of the afore-mentioned. Typically, when waste and residue material are used they comprise mixtures of several components.

In an embodiment, the feedstock of biological origin contains C8-C22 hydrocarbons, C10-C20 hydrocarbons, or C15-C18 hydrocarbons.

Hydrotreatment

Several process conditions for hydrotreatment, and specifically hydrodeoxygenation, are known. For example, the hydrodeoxygenation of feedstock of biological origin may be carried out on sulfided metal catalyst or a metal sulphide catalyst. The metal may comprise one or more Group VI metals, such as Mo or W, or one or more Group VIII non-noble metals such as Co or Ni. The catalyst may be supported on any convenient support, such as alumina, silica, zirconia, titania, amorphous carbon, zeolite, molecular sieves or combinations thereof. Usually the metal is impregnated or deposited on the support as metal oxides and then typically converted into their sulphides. Examples of typical catalysts for hydrodeoxygenation are molybdenum containing catalysts, NiMo, CoMo, or NiW catalysts, supported on alumina or silica, but many other hydrodeoxygenation catalysts are known in the art, and have been described together with or compared to NiMo and/or CoMo catalysts. The hydrodeoxygenation is preferably carried out under the influence of sulphided NiMo or sulphided CoMo or NiW catalysts in the presence of hydrogen gas.

The hydrodeoxygenation may be performed under a hydrogen pressure from 10 to 200 bar (absolute), at temperatures from 200 to 400° C., and liquid hourly space velocities of 0.2 h$^{-1}$ to 10 h$^{-1}$. During a hydrodeoxygenation step using a sulfided catalyst, the sulfided state of the catalyst may be maintained by the addition of sulphur in the gas phase or by using a feedstock having sulphur containing mineral oil blended with the feedstock of biological origin. The sulphur content of the total feed being subjected to hydrodeoxygenation may be, for example, in the range of 50 wppm (ppm by weight) to 20 000 wppm, preferably in the range of 100 wppm to 1000 wppm.

Effective conditions for hydrodeoxygenation may reduce the oxygen content of the feedstock of biological origin to less than 1 wt-%, such as less than 0.5 wt-% or less than 0.2 wt-%. In some cases, the conditions may be selected to yield partial hydrodeoxygenation corresponding to a deoxygenation of at least 40 wt-%, at least 50 wt-% or at least 75 wt-%.

In a preferred embodiment, preparing a paraffinic hydrocarbon intermediate of biological origin from feedstock of biological origin comprises subjecting the feedstock to a deoxygenation treatment.

In the present invention, the deoxygenating method is not particularly limited and any suitable method may be employed. Suitable methods are, for example, hydrotreating, such as hydrodeoxygenation (HDO), catalytic hydrodeoxygenation (catalytic HDO), catalytic cracking (CC), or a combination thereof. Other suitable methods include decarboxylation and decarbonylation reactions, either alone or in combination with hydrotreating.

In one embodiment, the deoxygenation treatment, to which the feedstock of biological origin is subjected, is hydrotreatment. Preferably, the feedstock of biological origin is subjected to hydrodeoxygenation (HDO) which preferably uses a HDO catalyst. Catalytic HDO is the most common way of removing oxygen and has been extensively studied and optimized. However, the present invention is not limited thereto. As the HDO catalyst, a HDO catalyst comprising hydrogenation metal supported on a carrier may be used. Examples include a HDO catalyst comprising a hydrogenation metal selected from a group consisting of Pd, Pt, Ni, Co, Mo, Ru, Rh, W or a combination of these, preferably from Ni, Mo or W. Alumina or silica is suited as a carrier, among others. The hydrodeoxygenation step may, for example, be conducted at a temperature of 100-500° C. and at a pressure of 10-150 bar (absolute).

In one embodiment, the hydrotreatment, preferably hydrodeoxygenation, is performed under a hydrogen pressure from 10 to 150 bar, such as 20-120 bar, such as 30-100 bar, and at a temperature from 200 to 400° C., such as 250-380° C., such as 280-360° C.

In one embodiment, the hydrotreatment is performed in the presence of one or more catalyst(s) selected from hydrogenation metal on a support, such as a catalyst selected from a group consisting of Pd, Pt, Ni, Co, Mo, Ru, Rh, W or any combination thereof, preferably a catalyst comprising one or more catalyst(s) selected from CoMo, NiMo, NiW, CoNiMo on a support, for example an alumina support.

The hydrodeoxygenation may be accompanied by hydrodesulphurisation, hydrodearomatization, hydrodenitrification, and/or hydrodechlorination reactions.

Preparing a hydrotreated feedstock from the feedstock of biological origin may comprise a step of hydrocracking hydrocarbons in feedstock of biological origin. Thus, the chain length of the hydrocarbon of biological origin may be adjusted and the product distribution of the produced mixture of hydrocarbons of biological origin can be indirectly controlled.

Isomerization

The paraffinic hydrocarbon intermediate of biological origin of the present invention may be provided by subjecting at least straight chain hydrocarbons obtained by hydrotreatment to an isomerization.

While most thermal or catalytic conversions (such as HDO) result in a minor degree of isomerization, usually less than 5 wt-%, or even less than 1 wt-%, such as 0.5 or less, the isomerization step may be employed as a step which leads to a significant increase in the content of isoparaffins.

Isomerization causes branching of hydrocarbon chains of the hydrotreated feedstock. Branching of hydrocarbon chains improves e.g. cold properties, the isomerised hydrocarbons have better cold properties compared to merely hydrotreated feedstock. Better cold properties refer to e.g. a lower temperature value of a pour point. The formed isoparaffins may have one or more side chains, or branches, typically methyl or ethyl groups.

The isomerization step may be carried out in the presence of an isomerization catalyst, and optionally in the presence of hydrogen added to the isomerisation process. Suitable isomerisation catalysts contain a molecular sieve and/or a metal selected from Group VIII of the periodic table and optionally a carrier. Preferably, the isomerization catalyst contains SAPO-11, or SAPO-41, or ZSM-22, or ZSM-23, or fernerite, and Pt, Pd, or Ni, and $Al_2O_3$, or $SiO_2$. Typical isomerization catalysts are, for example, Pt/SAPO-11/$Al_2O_3$, Pt/ZSM-22/$Al_2O_3$, Pt/ZSM-23/$Al_2O_3$, and Pt/SAPO-11/$SiO_2$. The catalysts may be used alone or in combination. The presence of added hydrogen is particularly preferable to reduce catalyst deactivation. In a preferred embodiment, the isomerisation catalyst is a noble metal bifunctional catalyst, such as Pt-SAPO and/or Pt-ZSM-catalyst, which is used in combination with hydrogen.

The isomerization step, preferably hydroisomerization, may, for example, be conducted at a temperature of 200-500° C., such as 280-400° C., such as 280-370° C. and at a pressure of 10-150 bar (absolute), such as 20-100 bar, such as 20-50 bar.

The isomerization is performed, for example, in the presence of one or more catalyst(s) comprising a Group VIII metal on a support, where the support is selected from silica, alumina, clays, titanium oxide, boron oxide, zirconia, which can be used alone or as a mixture, preferably silica and/or alumina.

In an embodiment, the isomerization is performed at a temperature of 300° C. or above, preferably at 300-350° C., such as 330-350° C.

The Paraffinic Hydrocarbon Intermediate of Biological Origin

The paraffinic hydrocarbon intermediate of biological origin of the present invention may be provided by isomerizing a hydrotreated feedstock of biological origin.

Generally, a paraffinic hydrocarbon intermediate may be produced from the feedstock of biological origin material using any known method. Specific examples of a method for producing the paraffinic intermediate of biological origin are provided in the European patent application EP 1741768 A1. Also, other methods may be employed, particularly another BTL (biomass-to-liquid) method may be chosen, for example biomass gasification followed by a Fischer-Tropsch method.

The paraffinic hydrocarbon intermediate of biological origin may be obtained by hydrodeoxygenation and isomerization of feedstock of biological origin. The paraffinic hydrocarbon intermediate, such as liquid paraffinic hydrocarbon intermediate, thus obtained has a carbon number distribution in the range of C8 to C22 or C10 to C20, preferably in the range of C15 to C18, and distillation range of 140° C. to 340° C., preferably 180° C. to 320° C. The paraffinic hydrocarbon intermediate contains mainly n-paraffins and i-paraffins.

The amount of i-paraffins may be adjusted through isomerization, such as isomerization temperature, to reach desired characteristics of the product fractions.

In an embodiment, the cloud point of the paraffinic hydrocarbon intermediate of biological origin is −30° C. or below, −34° C. or below, −40° C. or below, or −48° C. or below, as measured according to EN23015.

Examples of Production of the Paraffinic Hydrocarbon Intermediate of Biological Origin The feedstock of biological origin may be subjected at least to a hydrodeoxygenation reaction in the presence of hydrogen and a hydrodeoxygenation catalyst, and to an isomerization reaction in the presence of an isomerization catalyst, for obtaining the paraffinic hydrocarbon intermediate. If a hydrodeoxygenation step and an isomerization step are applied, these may be performed either simultaneously or in sequence.

In one embodiment the paraffinic hydrocarbon intermediate is produced in two steps, first hydrotreating the feedstock and subsequently isomerizing the hydrotreated feedstock. The hydrodeoxygenation reaction may be performed in the presence of hydrogen gas and a hydrodeoxygenation catalyst, such as CoMo, NiMo, NiW, CoNiMo on a support, for example, an alumina support, zeolite support, or a mixed support. The hydrodeoxygenation reaction may, for example, be conducted at a temperature in the range from 250 to 400° C., and at a pressure in the range from 10-150 bar, for example 250-380° C. and 20-120 bar, such as 280-360° C. and 30-100 bar, at a WHSV (weight hourly space velocity, i.e. mass flow/catalyst mass) in the range from 0.5 to 3 h−1, and a $H_2$/oil ratio of 350-900 Nl/l, using a catalyst, such as NiMo, optionally on an alumina support. The product of the hydrodeoxygenation step, i.e. the hydrotreated feedstock of biological origin, may be subjected to an isomerization step in the presence of hydrogen and an isomerization catalyst. The isomerization is preferably performed in the presence of one or more catalyst(s) comprising a Group VIII metal on a support, where the support is selected from silica, alumina, clays, titanium oxide, boron oxide, zirconia, which can be used alone or as a mixture, preferably silica and/or alumina. The isomerization catalyst may be a noble metal bifunctional catalyst such as Pt-SAPO or Pt-ZSM catalyst or NiW. The isomerization reaction may, for example, be conducted at a temperature of 200-500° C. and at a pressure of 10-150 bar (absolute). The isomerization reaction may, for example, be conducted at a temperature of 280-370° C., at a pressure of 10-50 bar (absolute), with WHSV of 0.5-3 h−1, and $H_2$/feed ratio of 100-800 Nl/l.

In one embodiment the hydrodeoxygenation and hydroisomerisation are carried out in a single step on the same catalyst bed using a single catalyst for this combined step, e.g. NiW, or a Pt catalyst, such as Pt/SAPO in a mixture with a Mo catalyst on a support, e.g. NiMo on alumina.

The hydrotreatment step and the isomerization step may be conducted in the same reactor. Alternatively, hydrotreatment step and the isomerization step may be conducted in separate reactors.

In one embodiment a marine fuel component is disclosed, which is produced from paraffinic hydrocarbon intermediate using hydrotreated and isomerised feedstock of biological origin.

In a specific embodiment the present invention provides a method for production of the marine fuel component of biological origin comprising hydrodeoxygenating and hydroisomerizing a feedstock of biological origin to obtain a paraffinic hydrocarbon intermediate; and fractionating the paraffinic hydrocarbon intermediate into at least two fractions, comprising a light fraction fulfilling the specification for an aviation fuel component, and a heavy fraction fulfilling the specification for a marine fuel component, wherein the production capacity of the lighter fraction and the production capacity of the heavier fraction are adjusted by the selection of process conditions, preferably the isomerization conditions, wherein a yield of the lighter fraction is 60-90 wt-% of the total weight of the fractions, and a yield of the heavier fraction is 10-40 wt-% of the total weight of the fractions, and wherein the aviation fuel component is HEFA-SPK fuel component, and wherein a specification for the HEFA-SPK fuel component is ASTM D7566-20, and wherein a combined yield of the two fractions is at least 98 wt-% of the paraffinic hydrocarbon intermediate of biological origin. Although the fractionation of the paraffinic hydrocarbon intermediate allows recovery of a lighter fraction meeting specifications for the HEFA-SPK fuel, surprisingly the heavier fraction was by no means a residue, but according to the present method was recoverable as a marine fuel component of biological origin meeting the specifications of ISO 8217(2017) for marine fuel.

Fractionation

The paraffinic hydrocarbon intermediate of biological origin of the present invention provided by isomerized hydrotreated feedstock is suitably fractionated for obtaining at least two fuel components, one suitable for as aviation fuel and one suitable for as marine fuel.

In an embodiment, the fractionating is provided by distillation. In the distillation process, the cloud point, distillation profile and density of the paraffinic hydrocarbon intermediate influences the yields of the distillates. To maximize the yield of the aviation fuel component, or more specifically HEFA-SPK component, a paraffinic hydrocarbon intermediate with a lower cloud point may be utilized. A typical cloud point of the paraffinic hydrocarbon intermediate may be in the range of −30° C. or below, or in the range of −34° C. or below, without restricting it to that.

The balance between renewable marine fuel component and aviation fuel component amounts or volumes produced may be adjusted by the selection of process conditions in the production process of the paraffinic hydrocarbon intermediate of biological origin, which affects the distillation cut point between the product fractions. This makes it possible to provide a cost-efficient and material-efficient yet flexible way to produce these paraffinic products of biological origin with only trace amounts of by-products, if any, being produced. For example, less than 2 wt-% or even less than 1 wt-% of by-products lighter than aviation fuel or heavier than marine fuel, may be generated. This means that the yield of the two fractions is at least 98 wt-% or at least 99 wt-%, calculated from the amount of paraffinic hydrocarbon intermediate subjected to fractionation. In certain embodiments the yield of the two fractions may be 99.5 wt-%, 99.8 wt-% or even 100 wt-% of the amount of paraffinic hydrocarbon intermediate subjected to fractionating.

In an embodiment, yield of the lighter fraction is 60-90 wt-% of the total weight of the two fractions, and a yield of the heavier fraction is 10-40 wt-% of the total weight of the two fractions.

In an embodiment, yield of the lighter fraction is 70-90 wt-% of the total weight of the two fractions, and a yield of the heavier fraction is 10-30 wt-% of the total weight of the two fractions, such as 75 wt-% lighter fraction and 25 wt-% of the heavier fraction.

In an embodiment, yield of the lighter fraction is 80-90 wt-% of the total weight of the two fractions, and a yield of the heavier fraction is 10-20 wt-% of the total weight of the two fractions.

Shorter chain hydrocarbons enable producing more aviation fuel component and less marine fuel component. More marine fuel component is produced by using plenty of C16 or longer chain hydrocarbons, such as from C16 to C29, as the feedstock of biological origin.

Fuel compositions boil over a temperature range as opposed to having a single boiling point for a pure compound, due to a selection of compounds of varying carbon chain length ranges included therein. The boiling range covers a temperature interval from the initial boiling point, IBP, defined as the temperature at which the first drop of distillation product is obtained, to a final boiling point, FBP, when the highest-boiling compounds evaporate.

According to an embodiment, a paraffinic hydrocarbon intermediate of biological origin having a cloud point (CP), verified with analysis method ASTM D5773 for example, of −45° C., and having a freezing point (FP), verified for example with analysis method IP 529, of −41° C., and being of biological origin, such as vegetable origin, is distilled into two cuts: IBP-68% and 68%-FBP. This enables obtaining two products, one (IBP-68%) fulfilling the HEFA-SPK specification ASTM D7566-20 Annex A2 and one (68%-FBP) fulfilling the standard ISO 8217(2017) for the marine fuel, without the need for any other processing steps. A yield of the light cut (IBP-68%) fulfilling the HEFA-SPK specification of 68 wt-% may be obtained, and a yield of the heavy fraction (68%-FBP) fulfilling the marine fuel specification of 32 wt-% may be obtained.

According to another embodiment, a paraffinic hydrocarbon intermediate of biological origin having a cloud point (CP) of −49° C. or below, may be distilled into two cuts: IBP-80% and 80%-FBP, which thus enables obtaining two products only, one (IBP-80%) fulfilling the HEFA-SPK specification and the other (80%-FBP) fulfilling the standard for the marine fuel, without the need for other processing steps. A yield of the light cut fulfilling the HEFA-SPK specification of 80 wt-% may be obtained, and a yield of the heavy fraction fulfilling the marine specification of 20 wt-% may be obtained.

The present invention thus discloses a method for combined production of two paraffinic hydrocarbon products, an aviation fuel component and a marine fuel component, by hydrodeoxygenation and isomerization of feedstock of biological origin followed by fractionating. More specifically, the present invention discloses a method for combined production of paraffinic products of biological origin, comprising hydrodeoxygenation and isomerization of feedstock of biological origin, followed by fractionating thus obtaining paraffinic hydrocarbon intermediate by e.g. distillation into at least two fractions, such as two fractions. Preferably, the two fractions are a lighter fraction fulfilling the specification for an aviation fuel component, and a heavier fraction fulfilling the specification for a marine fuel component.

The processing conditions may be selected suitably to obtain a desired yield ratio for the two fractions, and to adjust the technical performance characteristics thereof. Especially, a higher temperature and/or longer residence time in the isomerization stage may be applied to increase the downstream distillation yield of the HEFA-SPK component. Moreover, selecting feedstock of biological origin providing a high amount of hydrocarbons shorter than or equal to C17 hydrocarbons may increase the yield of the HEFA-SPK component.

In one embodiment, the paraffinic hydrocarbon intermediate for the fractionation, preferably by distillation, is provided by catalytic hydrotreatment, preferably catalytic hydrodeoxygenation, and catalytic isomerization of feedstock of biological origin.

In a yet further embodiment, the paraffinic hydrocarbon intermediate may be obtained by combined hydrotreatment and isomerization, preferably combined catalytic hydrotreatment and isomerization.

In some cases feedstock may contain recycled material in addition to e.g. waste and residues, such as recycled plastics material of biological origin, for example.

One embodiment enables the use of the paraffinic hydrocarbon intermediate production process for combined production of two high value products. It is seen beneficial for the aviation fuel product to fractionate out the heaviest components from the paraffinic hydrocarbon intermediate as explained, whereas it is at the same time needed to remove the lightest components from marine product to ensure safety in terms of adequately high flash point.

In an embodiment, the production capacity of the marine fuel component and the aviation fuel component may be adjusted by the selection of the process conditions and feedstock composition in the paraffinic hydrocarbon intermediate production process. This makes it possible to find a cost-efficient and material-efficient way for production of these products without formation of any other by-products.

Figure 2:
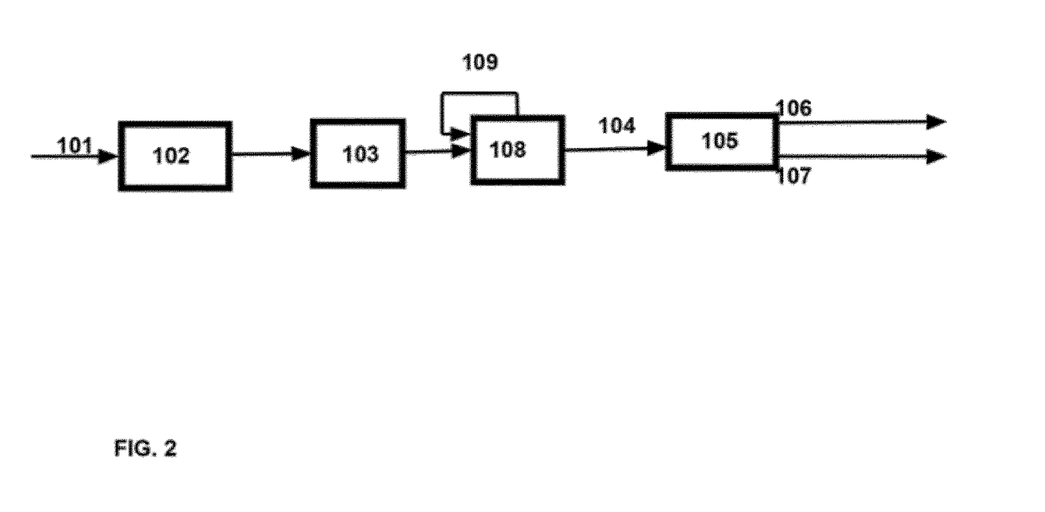
FIG. 2 illustrates another exemplary process.

The low temperature performance of the marine fuel component and/or the aviation fuel component may be improved by having a high isoparaffin content of the paraffinic hydrocarbon intermediate through adjusting the isomerization. The isomerisation temperature may be selected from the higher end of the temperature range, such as from 330° C. to 340° C., whereby cracking tendency is enhanced. Moreover, the density and the flash point of the obtained components may be decreased by increasing the reflux rate or amount of lighter components after isomerization. The liquid effluent from the isomerization may be directed to stabilization in a stabilization column at lowered pressure compared to isomerization, wherein an overhead fraction is formed in addition to the liquid paraffinic hydrocarbon intermediate. This overhead fraction comprises hydrocarbons in the naphtha range (C4-C8). This overhead fraction from the stabilization may be recovered and used as a gasoline component, or preferably, it may be recycled back to the stabilization for refluxing, preferably into the stabilization column as depicted in FIG. 2. Thus, preferably according to the present invention the feedstock is subjected, after hydrotreatment and isomerization, to stabilization at a pressure lower than the isomerization pressure. The recycled amount of the hydrocarbons in the naphtha range used for refluxing may be from 80 wt-% or more, preferably 90 wt-% or more, such as from 90 to 95 weight-%, of the formed hydrocarbons in the naphtha range at the stabilization column overhead. A high recycle amount aids in the subsequent separation of the lighter and heavier fractions, and increases the yields of the obtained aviation fuel and marine fuel components. Naturally, a higher refluxing requires adjustment of the equipment for higher flow. Thus, preferably according to the present invention during stabilization an overhead fraction comprising hydrocarbons in the naphtha range (C4-C8) is formed, and an amount of 60 wt-% or more, such as 90 wt-% or more, such as from 90 to 95 wt-%, of the formed hydrocarbons in the naphtha range at the stabilization column overhead is recycled back to the stabilization.

For the marine fuel component it may be beneficial to further refine the marine fuel component containing fraction by a second fractionating step to eliminate even trace amounts of heavy components or other undesired impurities.

Figure 1:
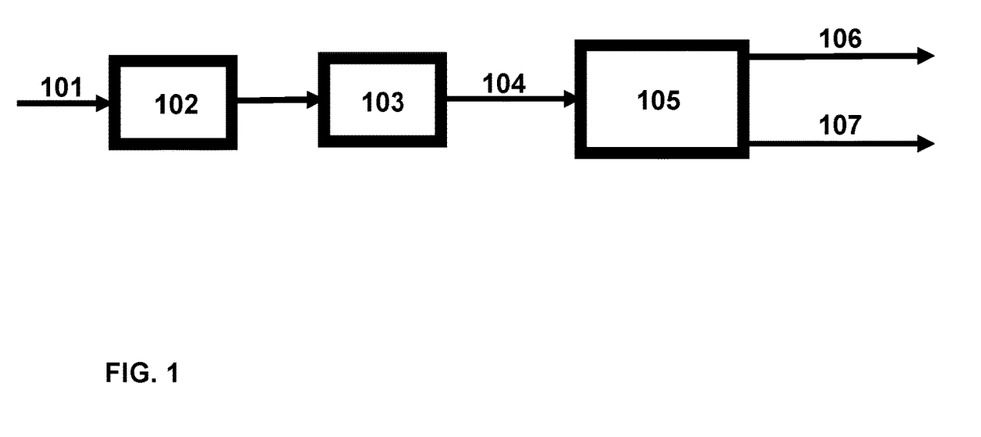
FIG. 1 illustrates an exemplary process.

FIG. 1 illustrates an exemplary process wherein feedstock of biological origin (101) is subjected to hydrotreatment and isomerization in two reaction steps, namely first subjecting the feedstock to hydrodeoxygenation in a hydrodeoxygenation zone (102) and subsequently subjecting the hydrodeoxygenated feedstock to isomerization in an isomerization zone (103). The paraffinic hydrocarbon intermediate (104) obtained after isomerization is further subjected to fractionation by distillation in a distillation column (105). As a result, two fractions (106 and 107) are obtained from the distillation. In the two fractions, the lighter fraction (106) is a distillate fulfilling a specification for HEFA-SPK fuel component, and the heavier fraction (107), which may be the bottom fraction, is suitable for a marine fuel component. The HEFA-SPK fuel component (106) may be obtained from paraffinic hydrocarbon intermediate (104) during a distillation from an initial boiling point (IBP) to for example cut point of about 280-290° C., such as 282° C., to achieve a HEFA-SPK component (106) with a mass yield of 68 wt-% compared to distillation feed (104). Consequently, the distillation bottom component (107) is obtained from cut point of about 280-290° C., such as 282° C., to final boiling point (FBP) with a 32 wt-% yield compared to distillation feed mass. The marine fuel component (107) may be the bottom fraction from the distillation column (105), or the heavier fraction from the distillation (105).

FIG. 2 illustrates another exemplary process, wherein feedstock of biological origin (101) is subjected to hydrotreatment and isomerization in two reaction steps, namely first subjecting the feedstock to hydrodeoxygenation in a hydrodeoxygenation zone (102) and subsequently subjecting the hydrodeoxygenated feedstock to isomerization in an isomerization zone (103). The hydrodeoxygenated and isomerized feedstock enters stabilization in a stabilization zone (108). During stabilization a gaseous overhead fraction is formed due to pressure decrease, and in addition the liquid paraffinic hydrocarbon intermediate (104) may be directed into fractionation (105). The gaseous overhead fraction comprises hydrocarbons in the naphtha range (C4-C8). Most of these naphtha range hydrocarbons of the overhead fraction from stabilization are recycled (109) back to stabilization. The liquid paraffinic hydrocarbon intermediate (104) obtained is further subjected to fractionation by distillation in a distillation column (105). As a result, two fractions (106 and 107) are obtained from the distillation. In the two fractions, the lighter fraction (106) is a distillate fulfilling a specification for aviation fuel component, and the heavier fraction (107), which may be the bottom fraction, fulfils a specification for marine fuel component. As an example, HEFA-SPK fuel component (106) fulfilling the specification ASTM D7566-20 Annex A2 may be obtained from paraffinic hydrocarbon intermediate (104) during a distillation from an initial boiling point (IBP) to cut point of, for example, about 280-290° C., such as 282° C., to achieve a HEFA-SPK component (106) with a mass yield of 68 wt-% compared to distillation feed (104) mass. Consequently, the distillation bottom marine fuel component (107) is obtained from cut point of, for example, about 280-290° C., such as 282° C., to final boiling point (FBP) with a 32 wt-% yield compared to distillation feed mass. The marine fuel component (107) may be the bottom fraction from the distillation column (105), or the heavier fraction from the distillation (105).

The Aviation Fuel Component of Biological Origin

A specification for an aviation fuel component may refer to one or more or all specifications of ASTM D7566-20 Annex A2 for HEFA-SPK (synthesized paraffinic kerosene from hydroprocessed esters and fatty acids), such as density (at 15° C.), flash point, freezing point, thermal stability, distillation-10% recovery, distillation-50% recovery, distillation-FBP, distillation-residue, distillation-loss, and/or existent gum, especially at least density (at 15° C.), thermal stability and freezing point.

In an embodiment, a HEFA-SPK fuel component obtainable by said method is disclosed.

In an embodiment, the HEFA-SPK fuel component has a density of less than 772 kg/m$^3$ as measured at 15° C. according to ASTM D4052, preferably less than 770 kg/m$^3$, more preferably less than 169 kg/m$^3$.

In an embodiment the HEFA-SPK fuel component has a density of from 772 kg/m$^3$ to 750 kg/m$^3$, preferably 772 kg/m$^3$ to 760 kg/m$^3$, more preferably from 770 kg/m$^3$ to 765 kg/m$^3$ as measured at 15° C. according to ASTM D4052.

In an embodiment the HEFA-SPK fuel component has a freezing point of less than −40° C. as measured according to IP529, preferably less than −45° C., more preferably less than less than −50° C., most preferably less than −53° C.

In an embodiment the HEFA-SPK fuel component has a freezing point from −40° C. to −65° C., preferably from −40° C. to −60° C., more preferably from −40° C. to −55° C. as measured according to IP529.

In an embodiment the HEFA-SPK fuel component has a flash point from 50° C. to 75° C., preferably from 60° C. to ° C. 70° C. as measured according to IP170.

The Marine Fuel Component of Biological Origin

In an embodiment a marine fuel component of biological origin is provided, also referred to as marine fuel component of the present invention. In accordance with the present invention, the heavier fraction of the fractionation of the paraffinic hydrocarbon intermediate may be used as a marine fuel component, suitable for blending with other marine fuels.

In an embodiment the present invention provides a marine fuel component of biological origin, obtainable by the method of the present invention. The marine fuel component fulfils the requirements of ISO 8217.

Structurally the marine fuel component of the present invention may be defined by the carbon chain length i.e. carbon number ranges and by the branching of the compounds. The marine fuel component of biological origin comprises 0-5 wt-% of n-paraffins in C16-C20 range and 90-97 wt-% isoparaffins in C16-C20 range, from 21 wt % to 45 wt % of C17 paraffins and from 50 wt % to 75 wt % of C18 paraffins.

In an embodiment the marine fuel component of biological origin comprises 0-8 wt-% of n-paraffins in C17-C19 range, preferably 0-5 wt-%, because with a reduced n-paraffin concentration the fuel cold properties e.g. cloud point and/or pour point are improved.

In an embodiment the marine fuel component of biological origin comprises 85-97 wt-% isoparaffins in C17-C20 range, preferably 88-97 wt-%, because with an increased isoparaffin concentration the fuel cold properties are improved.

In an embodiment marine fuel component of biological origin comprises from 21 wt % to 43 wt % of C17 paraffins.

In an embodiment the marine fuel component of biological origin comprises from 45 wt % to 75 wt % of C18 paraffins, preferably 53-75 wt-%, to increase the fuel density and enable blending at high blend ratios.

In an embodiment the marine fuel component of biological origin comprises 0-4 wt-% of n-paraffins in C17-C18 range and 85-95 wt-% isoparaffins in C17-C18 range.

In an embodiment isomerization degree of the marine fuel component is 90-99.9%, such as 95-99%. The isomerization degree is defined as the ratio of the amount of i-paraffins to the total amount of paraffins by weight. The weight ratio of i-paraffins to n-paraffins in the C14-C20 range is from 18 to 32.

The marine fuel component of biological origin complies with the ISO 8217(2017) standard for marine fuel specifications, and has modern carbon content (pMC) of about 100% (ASTM D6866). Increasing the bio content of marine fuel i.e. decreasing the use of fossil marine fuel will reduce the greenhouse gas emissions (GHG). Replacing a fossil marine fuel totally with the marine fuel component of the present invention results in at least 50% reduction, such as at least 70% reduction, or even such as 90% reduction, in GHG emissions (gCO2eq/MJ), when emissions over the life cycles of fuels are taken into account using a calculation method complying with the EU Renewable Energy Directive 2009/28/EC.

The marine fuel standard provides several specifications for the properties of the component essential for its functionality, as well as maximum impurity levels. In addition to complying with the specifications set in ISO 8217(2017), the marine fuel component further complies with one or more, preferably even all, of the requirements as defined by the following embodiments:

In an embodiment the marine fuel component has kinematic viscosity at 40° C. as measured according to EN ISO 3104 of below 4.5 $mm^2/s$, such as below 4.0 $mm^2/s$, or even below 3.8 $mm^2/s$.

In an embodiment the marine fuel component has a flash point as measured according to EN ISO 2719 of at least 100° C., such as at least 120° C., such as at least 130° C., more particularly at least 145° C.

In an embodiment the marine fuel component of biological origin has total aromatics less than 1 ppm, such as less than 0.7 ppm, or even such as less than 0.6 ppm (EN 12916).

In an embodiment the marine fuel component of biological origin has cetane index of at least 56, such as at least 70, or such as at least 90, or even more than 95 (ISO 4264). The measured cetane number (EN 15195) is at least 75, such as at least 80, or such as at least 82;

In an embodiment the marine fuel component of biological origin has density (15° C.) less than 890 $kg/m^3$, such as less than 850 $kg/m^3$, such as from 850 to 750 $kg/m^3$, even such as from 820 to 770 $kg/m^3$ (EN ISO 12185).

In an embodiment the marine fuel component has a cloud point (ISO 3015) of lower than −20° C., such as lower than −25° C., such as lower than −30° C., or even −32° C. or lower.

In an embodiment the marine fuel component has water content (ISO 3733) less than 0.3 vol-%, such as less than 0.05 vol-%.

In an embodiment the marine fuel component has acid number (ASTM D664) less than 0.5 mg KOH/g, such as less than 0.1 mg KOH/g, such as less than 0.001 mg KOH/g.

In an embodiment the marine fuel component has pour point (ISO 3016) lower than −20° C., such as lower than −25° C., such as lower than −30° C., or even −40° C. or lower.

In an embodiment the marine fuel component of biological origin has an oxidation stability (EN ISO 12205) less than of at least 25 g/m3, such as less than 10 g/m3, or even such as less than 5 g/m3. Some of the measured values may be extremely low, such as less than 1 g/m3.

The FAME (fatty acid methyl ester) content of the marine fuel component of the present invention is very low, essentially it is free of any oxygen containing compounds. There may only be some impurities below the level of 0.1 ppm.

The amount of other metallic impurities, such as vanadium, sodium, aluminium, silicon, calcium and zinc are very low compared to maximum values allowable. Typically, the amount of each metal as metallic impurity is below 1 mg/kg, such as below 0.5 mg/kg, even below 0.1 mg/kg.

In an embodiment the marine fuel component has sulphur content (ISO 8754) less than 0.5 wt-%, such as less than 0.1 wt-%, such as less than 0.03 wt-%. The sulfur content in the marine fuel component of biological origin meets the technical requirement set to marine fuels to meet SECA (Sulphur Emission Control Area) objective.

In an embodiment the marine fuel component has a very low hydrogen sulphide content due to the manufacturing method according to the present invention. The hydrogen sulphide content (IP 570) is less than 2 mg/kg, such as less than 1 mg/kg.

In an embodiment the marine fuel component has the total sediment potential by ISO 10307-2 less than 0.1 wt-%, such as less than 0.01 wt-%.

In an embodiment the marine fuel component has a carbon residue (ISO 10370) less than 0.3 wt-%, such as less than 0.1 wt-%.

The marine fuel component has a very low cold filter plugging point (CFPP) which is advantageous for the fuel even if there is no specific requirement set for it in the ISO 8217. In an embodiment the CFPP (IP309) is less than −25° C., such as less than −30° C.

In an embodiment the marine fuel component has an ash content (ISO 6245) less than 0.04 wt-%, such as less than 0.001 wt-%.

The lubricity of the marine fuel component of the present invention as such is typically at the higher end of the ISO 8217 range when measured with HFRR (high frequency reciprocating rig). However, the lubricity may be improved by using a lubricity additive which is preferably added to the marine fuel component of the present invention, if used as such. In an embodiment the marine fuel component including a lubricity additive has a lubricity (ISO 12156-1) below 520 micro meter.

In an embodiment the marine fuel component of biological origin of the present invention is used as such as marine fuel, preferably including a lubricity additive.

In an embodiment the marine fuel component has a net heat of combustion (ASTM D4809) within the range of 33 to 36 MJ/l.

The marine fuel component is preferably obtained by the combined production method of the present invention. However, the use of the combined production method is not mandatory, instead the marine fuel component may also be produced by some other marine fuel production method.

Marine Fuel Blends

The marine fuel component of biological origin of the present invention may be used as such as marine fuel or it may be used as a blending component in marine fuel blends comprising additionally at least one other marine fuel component, which may be of biological or fossil origin.

For marine fuel blends an estimate of blend properties, such as pour point, is typically calculated based on the properties of the blend components, and then calculating the weighted average of the blend based on the proportion of the blend components. However, it is known that the calculated values may not provide an accurate estimate of the final value of the blend. Occasionally, the component having a poorer value may prevail, making it difficult to estimate the final blend properties. It is important to know the final blend properties for reliable and safe use of marine engines in avoiding problems when the blend is used in or transported at e.g. low temperatures.

The present invention also provides marine fuel blends comprising the marine fuel component of the present invention and at least one additional component suitable for use as marine fuel. This additional component may comprise
HVO (hydrotreated vegetable oil),
fossil marine fuel, such as marine distillate fuels of DM type, such as DMA, DMZ, DMX or DMB types, and/or marine residual fuels of RM type, such as RMA, RMB, RMD or RME types,
FAME (fatty acid methyl ester) i.e. biodiesel in accordance with EN14214 or ASTMD6751.

By the "fossil marine fuel" is meant herein any fossil fuel suitable for use as marine fuel, e.g. DM type or RM type fossil marine fuels fulfilling the requirements set in the ISO 8217(2017) tables 1 and 2. Moreover, fossil marine fuel may comprise several different types of fossil marine fuels, the blends thereof meeting the requirements of the ISO 8217 (2017).

By "HVO" is meant herein renewable diesel fuel originating from e.g. hydrotreated vegetable oil (HVO) which may be produced to meet the EN 15940 requirements that has not been further distilled into lighter and heavier fractions. One example of which is the commercially available Neste MY Renewable Diesel™, renewable diesel fuel obtained by a process according to e.g. EP1741768B1, or any other type of renewable diesel fuel, such as paraffinic hydrocarbons boiling in the diesel range made by e.g. varying ways of hydroprocessing or obtained by Fischer-Tropsch (FT) synthesis, and fulfilling the EN15940 criteria. Sometimes renewable diesel fuel is also called "synthetic paraffinic diesel" which may likewise comprise diesel boiling range paraffinic hydrocarbons obtainable from renewable feedstock by hydroprocessing, gas to liquid (GTL) fuel, biomass to liquid (BTL) fuel, FT fuel, or mixtures thereof. The HVO fuel when blended to form the marine fuel must meet the specifications of the ISO 8217(2017).

By "FAME" is meant herein oxygen containing fatty acid C1-C4 alkyl esters, such as fatty acid methyl ester (FAME) wherein the fatty acid may vary. Typically the term "biodiesel" is used to mean the same as FAME, and it is required to meet the specifications of ASTM D 6751 or EN 14214. The European standard EN 14214 specifies requirements for fatty acid methyl esters (FAME) to be used at 100 percent concentration or as a fuel extender for use in diesel engines in accordance with EN 590. FAME may typically be added to marine fuel up to 7 vol-% according to ISO 8217 (2017), and is discussed further in Annex A therein.

A marine fuel blend may be prepared by blending together various amounts of the additional marine fuel components in many ratios and adding thereto the renewable marine fuel component of the present invention. The blending may be performed by any available means. These blends including the marine fuel component of biological origin of the present invention may be used in marine engines and/or in marine vessels as fuel. If necessary, additives may further be included into the blend for improving the perforce thereof in terms of specific properties.

The marine fuel blends comprising the marine fuel component of the present invention meet the ISO 8217(2017) requirements. In addition, the quality of the blends may be even better than required by the standard, depending on desired properties required by the end users.

The marine fuel blends comprise from 1 wt-% to 99 wt-% of the marine fuel component of biological origin according to the present invention, and from 1 wt-% to 99 wt-% of an additional marine fuel component, said additional marine fuel component being selected from fossil marine fuel or HVO fuel or FAME, or a combination thereof, as presented in the following with some exemplary marine fuel blends. Said wt-% are calculated based on the total weight of the marine fuel blend.

Exemplary Marine Fuel Blends According to the Present Invention

Marine Fuel Blend I: Marine Fuel Component of the Present Invention and Fossil Marine Fuel In one embodiment the marine fuel blend comprises the marine fuel component of the present invention and a fossil marine fuel, such as DMB or RMB, wherein the blend comprises from 1 vol-% to 99 vol-% of the marine fuel component of the present invention and from 1 vol-% to 99 vol-% of the fossil marine fuel.

In an embodiment, the amount of the marine fuel component of the present invention is from 1 vol-% to 50 vol-%, such as from 25 vol-% to 50 vol-% the reminder being fossil marine fuel, for enhancing the desired properties of the fossil fuel, in addition to the bio content.

Marine Fuel Blend II: Marine Fuel Component of the Present Invention and HVO Fuel In one embodiment the marine fuel blend comprises the marine fuel component of the present invention and HVO fuel, wherein the blend comprises from 1 vol-% to 99 vol-% of the marine fuel of the present invention and from 1 vol-% to 99 vol-% of the HVO fuel. In these types of blends, the bio-content is not increased, but the preferred properties of the marine fuel component of the present invention may provide superior properties to the renewable blend. Preferably, the amount of the marine fuel component of the present invention is from 1 vol-% to 50 vol-%, such as from 25 vol-% to 50 vol-% the reminder being HVO fuel.

In one embodiment the blend comprises from 75 vol-% to 99 vol-%, preferably 50-75 vol-%, of the HVO fuel, the remainder being marine fuel component of the present invention.

Marine Fuel Blend III: Marine Fuel Component of the Present Invention, HVO Fuel and Fossil Marine Fuel In one embodiment the marine fuel blend comprises the marine fuel component of the present invention, HVO fuel and fossil marine fuel, wherein the blend comprises from 1 vol-% to 98 vol-% of the marine fuel component of biological of the present invention, from 1 vol-% to 98 vol-% of the HVO fuel and from 1 vol-% to 98 vol-% of the fossil marine fuel.

In one embodiment the blend comprises from 1 vol-% to 25 vol-%, preferably 10-25 vol-%, of marine fuel component of the present invention, the remainder being a mixture of HVO fuel and fossil marine fuel.

In one embodiment the blend comprises from 19 vol-% to 25 vol-%, preferably 19-22.5 vol-%, of the HVO fuel, the remainder being a mixture of marine fuel component of the present invention and fossil marine fuel.

In one embodiment the blend comprises from 56 vol-% to 75 vol-%, preferably 56-67.5 vol-%, of the fossil marine fuel, the remainder being a mixture of marine fuel component of the present invention and HVO fuel.

Marine Fuel Blend IV: Marine Fuel Component of the Present Invention and Fossil Marine Fuel and FAME In one embodiment the marine fuel blend comprises the marine fuel component of the present invention, FAME and fossil marine fuel, wherein the blend comprises from 1 vol-% to 98 vol-% of the marine fuel component of the present invention, from 1 vol-% to 98 vol-%, preferably from 1 vol-% to 7 vol-% of the FAME and from 1 vol-% to 98 vol-% of the fossil marine fuel.

In one embodiment the blend comprises from 1 vol-% to 50 vol-%, preferably 25-50 vol-%, of marine fuel component of the present invention, the remainder being FAME and fossil marine fuel.

In one embodiment the blend comprises from 5 vol-% to 7 vol-%, preferably 3.5-5 vol-%, of the FAME, the remainder being marine fuel component of the present invention and fossil marine fuel.

In one embodiment the blend comprises from 46.5 vol-% to 92 wt-%, preferably 46.5-70 vol-%, of the fossil marine fuel, the remainder being marine fuel component of the present invention and FAME.

Marine Fuel Blend V: Marine Fuel Component of the Present Invention, HVO Fuel, FAME and Fossil Marine Fuel In one embodiment the marine fuel blend comprises the marine fuel component of the present invention, HVO fuel, FAME and fossil marine fuel, wherein the blend comprises from 1 wt-% to 97 wt-% of the marine fuel component of the present invention, from 1 wt-% to 97 wt-% of HVO fuel from 1 wt-% to 97 wt-%, preferably from 1 wt-% to 97 wt-% of FAME and from 1 wt-% to 97 wt-% of the fossil marine fuel.

In one embodiment the blend comprises from 1 vol-% to 50 vol-%, preferably 25-50 vol-%, of the marine fuel component of the present invention, the remainder comprising a mixture of fossil marine fuel, HVO fuel and FAME.

In one embodiment the blend comprises from 12.5 vol-% to 25 vol-%, preferably 12.5-19 vol-%, of HVO fuel, the remainder comprising a mixture of fossil marine fuel, the marine fuel component of the present invention and FAME.

In one embodiment the blend comprises from 3.5 vol-% to 7 vol-%, preferably 3.5-5 vol-%, of FAME, the remainder comprising a mixture of fossil marine fuel, the marine fuel component of the present invention and HVO fuel.

In one embodiment the blend comprises from 34 vol-% to 68 vol-%, preferably 34-51 vol-%, of the fossil marine fuel, the remainder comprising a mixture of FAME, the marine fuel component of the present invention and HVO fuel.

The blends may be made by blending the components in any order, using commonly known methods. All wt-% as used in these exemplary blends, are calculated from the total weight of the blend in question.

For example, by making the blends above, the density, cloud point, oxidation stability and cetane number of the blends can be improved.

EXAMPLES

Example 1

Feedstock of biological origin provided for the experiments contained 73% AF (animal fat) and 27% PFAD (palm oil fatty acid distillate). After pretreatment by bleaching, the feedstock was subjected first to hydrodeoxygenation at about 300-340° C., about 50 bar, using sulphided NiMo on alumina catalyst with WHSV of about 2.7 h−1 and hydrogen flow about 590 Nl/l feed. Subsequently, the hydrodeoxygenated paraffinic hydrocarbon feedstock was directed to isomerization at 330-340° C., about 40 bar, in the presence of Pt-SAPO catalyst with WHSV of about 1.5 h−1 and a hydrogen to feed ratio of about 300 Nl/l feed. The effluent from the hydroisomerisation was stabilized by refluxing with the stripping steam of about 230 kg/h.

The obtained paraffinic hydrocarbon intermediate was fractionated by distillation into two cuts of biological origin; one fulfilling the specification ASTM D7566-20 Annex A2 for HEFA-SPK and one fulfilling the ISO 8217(2017) standard for marine fuel.

The distillation was performed using plant scale batch distilling apparatus. Yields from the plant scale distillation were:
initial boiling point (IBP) to 68% distillation point: 68 wt-% (i.e. the HEFA-SPK cut),
68% distillation point to final boiling point (FBP): 32 wt-% (i.e. the marine fuel component 1).

Example 2

In Table 1, the depicted results determined for the product 68%-FBP (component 1) of example 1 refer to key parameters defining the usability of the distilled product as a marine fuel component fulfilling the specifications of ISO 8217 standard for ISO-F-DMs (distillate) and/or RMs (residual) marine fuels, based on the most stringent criteria of the typical properties. The specifications vary depending on the product type (DM-type, RM-type) which is further illustrated by the ranges given in table 1. Exact specification values or ranges for the different properties and definition thereto for each of the fuel types are provided in more detail in the ISO 8217(2017), tables 1 and 2.

TABLE 1

| Standard | Method | Unit | Product 68%-FBP (component 1) Result | Standard ISO 8217, DM Limit | Standard ISO 8217, RM |
|---|---|---|---|---|---|
| ISO 3104 | Kinematic viscosity 40° C. | mm²/s | 3.76 | Max 5.5-11.00 | Max 10-700 |
| ISO 2719 | Flash point | ° C. | 136 | Min 43-60 | Min 60 |
| ISO 4264 | Cetane index | — | 96.8 | Min 35-45 | — |
| ISO 12185 | Density at 15° C. | kg/m3 | 787.1 | Max 890-900 | Max 920-1010 |
| ISO 3015 | Cloud point | ° C. | −33 | Max −16 | — |
| ISO 8754 | Sulphur | wt-% | <0.03 | Max 0.1 | Max 0.1/0.5 |
| IP 570 | Hydrogen sulphide | mg/kg | <1 | Max 2.00 | Max 2.00 |
| ASTM D664 | Acid number | mg KOH/g | <0.1 | Max 0.5 | Max 2.5 |
| ISO 10307-2 | Total sediment potential | mass % | <0.10 | — | Max 0.10 |

TABLE 1-continued

| Standard | Method | Unit | Product 68%-FBP (component 1) Result | Standard ISO 8217, DM Limit | Standard ISO 8217, RM |
|---|---|---|---|---|---|
| ISO 12205 | Oxidation stability | g/m3 | <1 | Max 25 | — |
| IP 579 | FAME | volume % | 0 | Max 7 | — |
| ISO 10370 | Carbon residue-Micro method on the 10% volume distillation residue | mass % | <0.1 | Max 0.30 | — |
| ISO 10370 | Carbon residue | mass % | <0.1 | Max 0.30 | Max 2.5-20 |
| IP309 | CFPP | ° C. | −31 | — | — |
| ISO 3016 | Pour point | ° C. | <−55 | Max (−6)-0 | Max 0-30 |
| ISO 3733 | Water | volume % | <0.05 | Max 0.30 | Max 0.30-0.50 |
| ISO 6245 | Ash | mass % | <0.001 | Max 0.010 | Max 0.04-0.15 |
| ISO 12156-1 | Lubricity | micro m | ≤520** | Max 520 | — |
|  | CCAI (calculated carbon aromaticity index) |  | 738 |  | Max 850-870 |
| IP 501 | Vanadium | mg/kg | <1 | — | Max 50-450 |
| IP 501 | Sodium | mg/kg | <1 | — | Max 50-100 |
| IP 501 | Aluminium plus silicon | mg/kg | <1 | — | Max 25-60 |
| IP 501 | ULO: calcium and zinc/Calcium and phosphorus | mg/kg | no ULO | — | If Ca > 30 and Zn > 15/Ca > 30 and P > 15 then contains ULO |

*EN15195 cetane number is 82.6
**Includes a lubricity additive

As shown in table 1, the marine fuel component 1 exhibits a high flash point which ensures safe product handling, meaning that the product can be handled more safely than typical marine fuel, as it is not categorized as flammable liquid according to the Regulation (EC No 1272/2008) on Classification, Labelling and Packaging (CLP). The cold properties and cetane number of the marine fuel component of example 1 are superior to typical marine fuels. Furthermore, the high cetane number and the low cloud point values ensure excellent combustion properties even at low winter temperatures. The marine fuel component 1 further exhibits good oxidation stability and low sulphur content. As the marine fuel component is produced by distillation, the cetane number is increased compared to the paraffinic hydrocarbon intermediate obtained from the isomerization.

The marine fuel component of example 1 complies with the ISO8217 standard for marine fuel and can therefore be used even as such in marine engines. Furthermore, it may be blended in varying blending ratios with other marine fuels as shown in further examples.

Table 2 shows the chemical composition obtained for the marine fuel component 1 in terms of carbon chain lengths for the hydrocarbon components thereof. The total amount of i-paraffins were 95.20 wt-% and n-paraffins 4.80 wt-%.

TABLE 2

| Carbon chain length | Total paraffin amount (wt-%) | i-paraffin amount (wt-%) |
|---|---|---|
| C14 and below | 0.79 | 0.74 |
| C15 | 0.86 | 0.78 |
| C16 | 5.80 | 5.02 |
| C17 | 35.86 | 33.36 |
| C18 | 53.7 | 52.45 |
| C19 | 1.73 | 1.65 |
| C20 and above | 1.25 | 1.21 |

The carbon number distribution of the component 1 is concentrated on the C16-C18 range. The amount of longer carbon chains, C19 and above, and heavier traces is limited to less than 3 wt-% which explains the low product cloud point. Furthermore, the low amount of shorter carbon chains, C15 and below, explain the high product flash point. The isomerization degree was over 95%.

Table 3 shows the distillation properties of the component 1 of example 1.

TABLE 3

| ASTM D86 (ENISO3405) | Component 1 |
|---|---|
| IBP (° C.) | 278.7 |
| T10 (° C.) | 290.3 |
| T50 (° C.) | 292.8 |
| T90 (° C.) | 297.9 |
| T95 (° C.) | 303.8 |
| FBP (° C.) | 316.6 |
| Distillation residue (wt-%) | 2 |
| Distillation loss (wt-%) | 0.6 |

The results shown in Table 4 for the IBP-68% product of example 1 confirm that this cut meets the renewable aviation fuel specification (ASTM D7566-20, Annex A2) for HEFA-SPK. Density requirement of below 772 kg/m3 (measured at 15° C. according to ASTM D4052) was achieved with the performed distillation wherein density of the feed to distillation was 779 kg/m3 (measured at 15° C. according to ASTM D4052). Freezing point of below −40° C. was achieved. In Table 4, the results for IBP-68% of example 1 refer to key parameters defining the usability of the distilled product as aviation fuel component as defined in ASTM D7566-20.

TABLE 4

| Standard | Method | Unit | IBP-68% | ASTM D7566-20 Annex A2 |
|---|---|---|---|---|
| ASTM D4052 | Density (at 15° C.) | kg/m³ | 771.8 | 730-772 |
| IP170 | Flash point | ° C. | 47.0 | Min. 38 |
| IP529 | Freezing point | ° C. | −49.5 | Max. −40 |
| ASTM D86 | Distillation-10% recovery | ° C. | 200.6 | Max. 205 |
| ASTM D86 | Distillation-50% recovery | ° C. | 266.0 | — |
| ASTM D86 | Distillation-FBP | ° C. | 285.3 | Max. 300 |
| IP540 | Existent gum | mg/100 ml | <1 | Max. 7 |
| ASTM D3242 | Total acidity | mg KOH/g | 0.002 | Max. 0.015 |

Example 3

A further experiment was made according to example 1, but wherein the distillation of the paraffinic hydrocarbon intermediate was performed in the following way:

initial boiling point (IBP) to 75% distillation point: 75 wt-% (i.e. HEFA-SPK cut), 57% distillation point to final boiling point (FBP): 25 wt-% (i.e. the marine fuel component 2).

The marine fuel component 2 (comp 2 in table 5) obtained from this distillation was blended with a commercial fossil DMB marine fuel (DMB, Marine Diesel Oil DMB grade by Neste) by blending together 5 vol-%, 20 vol-% and 50 vol % of the marine fuel component 2 and 95 vol-%, 80 vol-% and 50 vol-% of the DMB product, respectively. Table 5 shows the most essential properties of the blending components and the obtained blends.

TABLE 5

|  | DMB | DMB 95 vol-% + comp 2 5 vol-% | DMB 80 vol-% + comp2 20 vol-% | DMB 50 vol-% + comp 2 50 vol-% | comp 2 | DMB ISO 8217 (2017) |
|---|---|---|---|---|---|---|
| Density (kg/m3) ISO12185 |  | 877.7 | 863.9 | 835.4 | 787.1 | Max 900 |
| Pour point (° C.) D5950 | −3 | −6 | −12 | −18 | −48 | winter max 0 summer max 6 |
| KV40 (° C.) (mm2/s) ISO3104 | 9.164 | 8.674 | 7.422 | 5.620 | 3.892 | 2-11 |
| Flash point (° C.) ISO2719 |  | 92.5 | 97.5 | 109.5 | 147 | Min 60 |
| Oxidation stability (g/m3) ISO12205 | 1 | 1 | 1 | 1 | <1 | max 25 |

The blends of marine fuel component 2 with fossil marine fuel exhibit improved pour point compared to the pour point of fossil marine fuel. Additionally, the blends have improved flash points compared to fossil marine fuel.

Example 4

The marine fuel component 2 (comp 2) in table 6 obtained from example 3 was blended with a commercially available modified RMB fossil marine fuel i.e. RMB-type product modified by selecting a customer specific pour point deviating from the standard RMB ISO 8217 (2017) by blending together 5 vol-%, 20 vol-% and 50 vol % of the marine fuel component 2 and 95 vol-%, 80 vol-% and 50 vol-% of the modified RMB product, respectively. The used fossil marine fuel also fulfills the specifications for RMD ISO 8217 (2017) but as the most critical properties are the viscosities it is typically categorized as RMB. Table 6 shows the essential properties of the blending components and the obtained blends.

TABLE 6

|  | RMB modified | RMB modified 95 vol-% + comp 2 5 vol-% | RMBmodified 80 vol-% + comp 2 20 vol-% | RMB modified 50 vol-% + comp 2 50 vol-% | comp 2 | RMB ISO 8217 (2017) | RMD ISO 8217 (2017) |
|---|---|---|---|---|---|---|---|
| Density at 15° C. | — | 876.1 | 862.5 | 835 | 787.1 | max 960 | max 975 |

TABLE 6-continued

| | RMB modified | RMB modified 95 vol-% + comp 2 5 vol-% | RMB modified 80 vol-% + comp 2 20 vol-% | RMB modified 50 vol-% + comp 2 50 vol-% | comp 2 | RMB ISO 8217 (2017) | RMD ISO 8217 (2017) |
|---|---|---|---|---|---|---|---|
| (kg/m3) ISO12185 | | | | | | | |
| Pour point (° C.) ISO3016 | 30 | 30 | 27 | 15 | −48 | max 0/6 | max 30/30 |
| KV50 (° C.) ISO3104 | 11.12 | 10.26 | 8.154 | 5.441 | 3.174 | Max 30 | Max 80 |
| Flash point (° C.) ISO2719 | — | 123 | 124 | 133 | 147 | Min 60 | Min 60 |
| Carbon residue (wt-%) ISO 10370 | — | <0.10 | <0.10 | <0.10 | <0.10 | Max 10.00 | Max 14.00 |
| CCAI | — | 792 | 784 | 768 | 738 | Max 860 | Max 860 |

The kinematic viscosities and the pour points of the blends in table 6 were clearly decreased compared to the values of the fossil marine fuel, and the flash points were increased by increasing the bio-content. In some applications the pour point is not an essential feature as the fuel is heated up before the delivery thereof into the combustion compartment. However, increasing the bio content eventually also led to a value within the RMB specification.

In general, there is no need to analyse other ISO 8217 properties from the blends because the properties of the marine fuel component of example 1 (table 1) are excellent for marine use and therefore the limiting properties come from the fossil blending component.

The boiling ranges of components 1 and 2 (essentially C16-C18) are within the boiling ranges of DMB and RMB (C6-C33 and C6-C43, respectively) which means that the blends have a continuous composition and therefore the combustion and heat release are smooth.

The further marine fuel properties of blends in tables 5 and 6 were found to be in good agreement with the limits set by the relevant ISO 8217 standard.

The invention claimed is:

1. A method for combined production of aviation fuel and marine fuel both of biological origin, the method comprising:
    providing feedstock of biological origin containing fatty acids and/or esters of fatty acids;
    subjecting the feedstock to hydrotreatment and isomerization to obtain a paraffinic hydrocarbon intermediate;
    fractionating said paraffinic hydrocarbon intermediate into at least two fractions, a lighter fraction fulfilling the specification ASTM D7566-20 Annex A2 for aviation fuel, and a heavier fraction fulfilling the specifications of ISO 8217 (2017) for marine fuel; and
    adjusting production capacity of the lighter fraction and production capacity of the heavier fraction by selection of hydrotreatment process conditions, and/or isomerization process conditions, wherein yield of the lighter fraction is 60-90 wt-% of a total weight of the formed fractions, and yield of the heavier fraction is 10-40 wt-% of the total weight of the formed fractions;
    wherein a combined yield of the two fractions is at least 98 wt-% of the paraffinic hydrocarbon intermediate of biological origin.

2. The method according to claim 1, comprising:
    performing the hydrotreatment and/or a hydrodeoxygenation, under a hydrogen pressure from 10 to 150 bar, and/or 20-120 bar, and/or 30-100 bar, and at a temperature from 200 to 400° C., and/or 250-380° C., and/or 280-360° C.

3. The method according to claim 1, comprising:
    performing the hydrotreatment in a presence of one or more catalyst(s) selected from hydrogenation metal on a support, and/or a catalyst selected from a group consisting of Pd, Pt, Ni, Co, Mo, Ru, Rh, W and/or any combination thereof, and/or a catalyst containing one or more catalyst(s) selected from CoMo, NiMo, NiW, CoNiMo on a support.

4. The method according to claim 1, comprising:
    performing the isomerization at a temperature of 200-500° C., and/or 280-370° C., and at a pressure of 10-150 bar, and/or 20-50 bar.

5. The method according to claim 1, comprising:
    performing the isomerization in a presence of one or more catalyst(s) comprising:
    a Group VIII metal on a support, where the support is selected from at least one or more of silica, alumina, clays, titanium oxide, boron oxide, zirconia, which can be used alone and/or as a mixture, and/or silica and/or alumina.

6. The method according to claim 1, comprising:
    subjecting the feedstock, after hydrotreatment and isomerization, to stabilization at a pressure lower than the isomerization pressure.

7. The method according to claim 6, comprising:
    forming, during stabilization, an overhead fraction containing hydrocarbons in a naphtha range (C4-C8); and
    recycling an amount of 60 wt-% or more, and/or 90 wt-% or more, and/or from 90 to 95 wt-%, of the formed hydrocarbons in the naphtha range at the stabilization column overhead back to the stabilization.

8. The marine fuel component of biological origin obtained by the method according to claim 1.

* * * * *